United States Patent [19]

Münzenberger et al.

[11] Patent Number: 5,934,333

[45] Date of Patent: Aug. 10, 1999

[54] INTUMESCING MATERIAL FOR PIPE CUFFS

[75] Inventors: Herbert Münzenberger, Wiesbaden; Stefan Rump; Horst-Dieter Mika, both of Landsberg, all of Germany

[73] Assignee: Hilti Aktiengesellschaft, Schaan, Liechtenstein

[21] Appl. No.: 08/991,524

[22] Filed: Dec. 16, 1997

[30] Foreign Application Priority Data

Dec. 20, 1996 [DE] Germany .............. 196 53 503

[51] Int. Cl.$^6$ .................. F16L 9/00; F16L 11/00
[52] U.S. Cl. ............................ 138/109; 523/179
[58] Field of Search ................ 521/84.1, 143; 523/179; 220/235; 138/89, 109

[56] References Cited

U.S. PATENT DOCUMENTS

| 3,733,289 | 5/1973 | Burns et al. ............... 523/179 |
| 3,955,987 | 5/1976 | Schaar et al. ............. 428/921 |
| 4,273,879 | 6/1981 | Langer et al. ............. 521/140 |
| 4,675,221 | 6/1987 | Lalikos et al. ............ 138/109 |
| 4,678,607 | 7/1987 | Reitz ....................... 523/179 |
| 4,992,481 | 2/1991 | Bonin et al. .............. 521/54 |
| 5,297,691 | 3/1994 | Bottcher .................. 220/235 |
| 5,356,568 | 10/1994 | Levine ..................... 523/179 |
| 5,382,387 | 1/1995 | Bonin ...................... 252/602 |
| 5,608,963 | 3/1997 | Lefere ..................... 138/109 |
| 5,771,937 | 6/1998 | Collins .................... 138/93 |

*Primary Examiner*—Veronica P. Hoke
*Attorney, Agent, or Firm*—Brown & Wood, LLP

[57] ABSTRACT

A fire retardant molding composition for molded objects such as pipes and pipe cuffs includes a thermoplastic matrix including a matrix stabilizer and intumescing components including expandable graphite.

4 Claims, No Drawings

INTUMESCING MATERIAL FOR PIPE CUFFS

BACKGROUND OF THE INVENTION

The present invention is directed to molding compositions and molded objects having a matrix based on organic polymers and containing intumescing materials and other materials.

Numerous compositions are known which contain intumescing materials and other known fire-inhibiting materials, such as phosphates. Frequently, expensive polymers, such as polysilicones or epoxides are used as the matrix. Such compositions are disadvantageous because of the cost of the materials for the matrix and also because batchwise production is not technically advantageous.

SUMMARY OF THE INVENTION

It is the primary object of the present invention to produce molding compositions and molded objects from starting materials which are known to be readily available, and are advantageously priced and which can be easily produced. Other objects are evident from the advantages achieved in accordance with the present invention.

In accordance with the present invention, molding compositions and molded objects have a matrix based on organic polymers and including intumescing materials and other components, since the organic polymers in the matrix are formed of thermoplastic materials which soften at temperatures at least above 90° C., along with stabilizers for the organic polymers in the matrix and intumescing components having an expansion temperature higher than the softening temperature of the polymers forming the matrix.

DETAILED DESCRIPTION OF THE INVENTION

The matrix for the molding compositions and the molded objects is formed of readily available and economical thermoplastic materials, particularly polyethylenes, preferably crystalline polyethylenes melting at high temperatures, polypropylenes similar to the polyethylenes and preferably of high molecular weight, polyamides, and polyesters or mixtures of two or more of such thermoplastic materials can be used. The thermoplastic materials in the matrix can be present in a foamed form, whereby the matrix has a porous structure, preferably with a high pore volume. In addition, the matrix may contain conventional motive fluids, such as liquid hydrocarbons, for foaming the matrix polymers at the combustion temperatures. The matrix, formed of thermoplastic materials, may also contain components, such as fillers of the inorganic type, for instance kaolin, chalk, silica, rock flour and the like, pigments viscosity modifiers and similar conventional additives.

The molding composition and molded objects of the present invention contain matrix stabilizers for stabilizing the thermoplastic materials. The stabilization can take place in the mechanical sense, as well as in the chemical sense, that is, in the sense of delaying or avoiding a degradation. In addition to inorganic fillers, materials which carbonize or form a glass or a ceramic at the combustion temperatures may be included. Materials which carbonize and form a carbon framework, include carbohydrates, such as mono-, di- or polysaccharides such as sugar, starch, cellulose and pentaerythritol, optionally along with salts of strong inorganic acids, such as phosphoric acid or sulfuric acid and/or corresponding poly acids. Typical materials which form glass or ceramics have this property at the combustion temperature, as far as possible at the heated surface, but then in the whole volume or body, are alkali silicates, alkali aluminosilicates, alkali magnesium silicates, phosphates, phosphate-containing silicates or aluminates, organic or inorganic boron compounds and mixtures of materials forming glass or ceramics at the combustion temperature.

As matrix stabilizers materials have proven to be suitable, which, optionally together with antimony compounds, such as antimony trichloride or oxide, form anticatalytic, fire-inhibiting and/or incombustible gases at the combustion temperature. Examples of such materials are halogen compounds, such as chlorinated hydrocarbons, and/or compounds that split off carbon dioxide, such as carbonates, compounds that split off nitrogen, such as azodicarbonamide, organic hydrazides, such as azodicarbonamide, organic hydrazides, such as hydrozides of arylsulfonic acids, hexamethylenetetramine, guanidine or melamine and their salts, such as melamine borate. Such gases can also function as expansion agents for foaming the matrix at the combustion temperature.

As stabilizers, substances which react endothermically at the combustion temperature, for example, with the formation of water, such as $Al(OH)_3$ have also gained acceptance.

In the present invention, matrix stabilization is also important because, under combustion conditions, the intumescing components remain firmly tied in, and expanding in the entire volume of the composition or the molded object, can exert the combustion-inhibiting effect. Effective intumescing materials which had been found to be particularly effective are, in particular, expanding graphite, perlite, water-containing alkali silicates and or vermiculites. As far as possible, the expansion temperatures should be above the softening temperature of the matrix, for example, 10° or 20° C. or even 40° C. or more above the softening temperature of the matrix. Expanding graphites are well-known substances formed by the chemical treatment of graphite with intercalation of the treating agent between the lattice layers and by expanding the distances between the lattice layers.

In a particularly preferred embodiment, the molded objects of the present invention are formed by extrusion, optionally with simultaneous foaming of the matrix polymers. The molding compositions of the present invention are extrusile and with respect to the matrix polymers may be foamable. In any case, the molding compositions and molded objects of the present invention contain intumescing components with expansion temperatures above the extrusion temperature, for example, at least 5° C. above, and preferably more than 10° C. above and especially more than 30° C. above the extrusion temperature. The extrusion temperature generally is notably higher than the softening temperature of the composition. In the same way and under the same conditions, injection molding of the molding compositions and a manufacture of the molded objects by an injection molding process is possible.

The matrix stabilizers are contained mainly in an amount of 3–30% and preferably in the range of 10–35% by weight. The intumescing components are contained in an amount in a range of 2–50% and particularly in the range of 5–40% by weight, in each case based on the total weight of the molding composition or the entirety of the molded object.

The compositions of the present invention are preferably used as a fire-protection composition, for closing openings and joints and, particularly, for closing pipelines and openings for cables and pipes and as pipe cuffs. The foaming of the matrix polymers and/or expansion of the intumescing components, in each case, at the combustion temperatures, serve as pipe partitions closing off the pipe cross-sections of combustible and incombustible pipes.

We claim:

1. An expandable pipe cuff for a combustible pipe or pipeline for closing the pipe or pipeline in the event of a fire and preventing passage of the fire therethrough, said pipe cuff comprising a matrix including a stabilizer and intumescing material, said matrix comprising organic polymers formed of thermoplastic materials softening at a temperature above 90° C. and comprising at least one of polyethylene, poly propylene, and mixtures thereof with thermoplastic polyamides and polyesters, said matrix stabilizer comprising at least one of phosphates and an organic or inorganic glass forming boron compound, said intumescing material including 2–50° by weight expandable graphite expanding at least at 10° C. above the softening temperature of said thermoplastic materials, and forming said pipe cuff by one of extrusion and injection molding.

2. An expandable pipe cuff, as set forth in claim 1, wherein said expandable graphite being in a range of 5–40% by weight.

3. An expandable pipe cuff, as set forth in claim 1, wherein said matrix stabilizer being in a range of 3–30% by weight.

4. A method of forming an expandable pipe cuff for closing a pipe or pipeline in the event of a fire and preventing passage of the fire therethrough comprising the steps of forming a matrix including a stabilizer and intumescing materials with the matrix comprising organic polymers formed of thermoplastic material softening as a temperature above 90° C. and comprising at least one of polyethylene, polypropylene, and mixtures thereof with thermoplastic polyamides and polyesters, said stabilizer comprising at least one of phosphates and organic or inorganic glass-forming boron compound, the intumescing materials including 2–50% by weight expandable graphite expanding at least at 10° C. above the softening temperature of the thermoplastic material, and one of extruding and injection-molding the matrix as a pipe cuff.

* * * * *